Patented Sept. 5, 1950

2,520,915

UNITED STATES PATENT OFFICE 2,520,915

PREPARATION OF SODIUM CHLORITE

George L. Cunningham, New York, N. Y., and Frank Pretka, St. Paul, Minn., assignors to Diamond Alkali Company, Cleveland, Ohio, a corporation of Delaware No Drawing. Application April 26, 1945, Serial No. 590,514

3 Claims. (Cl. 23—85)

The present invention relates in general to the art of preparing oxidizing bleaching agents and in particular to a new and improved method of preparing sodium chlorite.

Heretofore it has not, to the best of our knowledge, been possible to produce sodium chlorite by the simple, direct method of contacting sodium hydroxide with chlorine dioxide without an equivalent quantity of sodium chlorate resulting. Consequently, because of the difficulty encountered in separating sodium chlorite from sodium chlorate and the low theoretical yield of sodium chlorite on the basis of the quantity reacted, this process has not been generally accepted for commercial production and indirect and more complicated substitutes have been devised and employed.

As a result of our invention, it is now possible to double the sodium efficiency so that theoretically all the sodium employed can be recovered as sodium chlorite. Moreover, because of our discovery, it is possible to produce sodium chlorite directly in a single step using chlorine dioxide, while realizing maximum sodium efficiency.

Briefly, the process of the present invention in a preferred embodiment comprises the steps of contacting chlorine dioxide gas with water containing hydroxides of sodium and potassium.

According to our invention as we prefer to practice it to produce premium grade sodium chlorite, gaseous chlorine dioxide prepared in any convenient manner and substantially free of contaminants such as carbon dioxide or chlorine, is passed into a sodium hydroxide-water solution containing potassium hydroxide in quantity approximately equimolar to said sodium hydroxide whereupon the reaction expressed in chemical language as follows takes place:

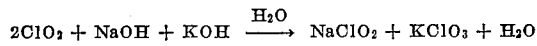

$$2ClO_2 + NaOH + KOH \xrightarrow{H_2O} NaClO_2 + KClO_3 + H_2O$$

By way of comparison, the following would be the reaction if, as taught by the art, aforesaid solution consisted of water and sodium hydroxide:

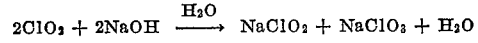

$$2ClO_2 + 2NaOH \xrightarrow{H_2O} NaClO_2 + NaClO_3 + H_2O$$

Since the water of the sodium hydroxide solution in the foregoing reactions is merely the medium and unaffected chemically by reagents or reaction products, its presence is indicated above the arrow in each instance.

When the bases (potassium and sodium hydroxides) are practically exhausted, that is, when the solution is neutral or slightly alkaline the flow of chlorine dioxide into said solution is discontinued as also is the agitation of the solution set up by suitable mechanical means before the gas and liquid were first contacted. Then, to recover the thus prepared sodium chlorite as a premium grade product having a maximum of bleaching power, the resulting aqueous mixture of sodium chlorite and potassium chlorate is dehydrated by evaporation until substantially all the potassium chlorate is precipitated, and a solid-liquid separation is effected through filtration. The solid phase consisting of potassium chlorate and substantially no sodium chlorite is desirably dehydrated and stored, while the liquid phase containing sodium chlorite is further concentrated to obtain solid sodium chlorite which is preferably dried and stored out of contact with air containing moisture, chlorine, carbon dioxide and like contaminants.

Although sodium chlorite, unlike sodium hypochlorite, is relatively stable in aqueous solution at temperatures up to the normal boiling point of water, provided that the solution is alkaline and is not exposed to actinic light, we prefer to treat and evaporate such solutions and dehydrate solid sodium chlorite under partial vacuum at temperatures below about 70° C. Such practice results in a consistently small percentage of decomposition and loss of chlorite although ideal pH and light conditions do not prevail, and it possesses the further advantage that sodium chlorite solubility is maintained at a minimum and product recovery and process efficiency is maximized.

It will be understood that without either departing from the spirit of our invention or going beyond the scope of the appended claims, procedures differing from the above described, except in the important ultimate results, may be employed. It is the fundamental concept of simultaneously producing sodium chlorite and potassium chlorate which our invention embraces and which we are claiming as novel and patentable. To illustrate, in addition to the method of the foregoing detailed description we contemplate the preparation of sodium chlorite and potassium chlorate by contacting sodium chlorate and potassium chlorite in an aqueous medium, or by passing in contact with an aqueous medium containing sodium hydroxide and potassium chlorite, chlorine dioxide. Certain refinements of and controls over these processes not beyond ordinary skill are not detailed here but will be obvious to those versed in the art and will be employed to advantage by them.

The present invention will perhaps be better understood by those skilled in the art by the following illustrative, but not limiting, example of our practice of it:

Example

To 1000 parts of water were added 40 parts of sodium hydroxide and 56.1 parts of potassium hydroxide, and chlorine dioxide diluted with air was passed into the resulting solution until 135 parts was absorbed and the solution was slightly acidic. The solution was then subjected to a vacuum of 28 inches of mercury and heated to a temperature of about 70° C. until 936 parts of water was removed, at which time the vacuum was relieved and the temperature was adjusted to 30° C. and 109 parts, or about 88.9%, of the potassium chlorate was precipitated. Through conventional filtration means, the solid potassium chlorate was separated from the liquid phase consisting essentially of water and sodium chlorite, and was heated and dried. The liquid phase again was heated under vacuum according to the foregoing conditions until solid sodium chlorite containing substantially no chemically uncombined water remained.

In this specification and the appended claims the weight basis is meant and referred to wherever parts, percentages or ratios of compositions or reagents are stated.

Having thus described the present invention so that others skilled in the art may be able to understand and practice the same, we state that what we desire to secure by Letters Patent is defined in what is claimed.

We claim:

1. In a process for preparing sodium chlorite substantially uncontaminated with sodium chlorate, the steps of forming a solution containing in admixture sodium ions, chlorite ions, chlorate ions, and potassium ions derived from a compound selected from the group consisting of potassium hydroxide and potassium chlorite, evaporating said solution under reduced pressure at a temperature below about 70° C. to obtain the precipitation of potassium chlorate, separately recovering said potassium chlorate, and then further evaporating said solution under reduced pressure and at a temperature below about 70° C. to precipitate substantially anhydrous sodium chlorite.

2. In a process for preparing sodium chlorite substantially uncontaminated with sodium chlorate, the steps of forming a solution containing in admixture sodium hydroxide and potassium ions derived from a compound selected from the group consisting of potassium hydroxide and potassium chlorite, passing chlorine dioxide into said solution until said solution reaches substantial neutrality, evaporating the solution under reduced pressure at a temperature below about 70° C. to obtain the precipitation of potassium chlorate, separately recovering said potassium chlorate, and then further evaporating said solution under reduced pressure and at a temperature below about 70° C. to precipitate substantially anhydrous sodium chlorite.

3. In a process for preparing sodium chlorite substantially uncontaminated with sodium chlorate, the steps of forming a solution containing in admixture sodium chlorate and a quantity of potassium chlorite substantially equivalent to said sodium chlorate, evaporating the solution under reduced pressure at a temperature below about 70° C. to obtain the precipitation of potassium chlorate, separately recovering said potassium chlorate, and then further evaporating said solution under reduced pressure and at a temperature below about 70° C. to precipitate substantially anhydrous sodium chlorite.

GEORGE L. CUNNINGHAM.
FRANK PRETKA.

REFERENCES CITED

The following references are of record in the file of this patent:

UNITED STATES PATENTS

| Number | Name | Date |
|---|---|---|
| 2,031,681 | Vincent | Feb. 25, 1936 |
| 2,169,066 | Cunningham | Aug. 8, 1939 |

OTHER REFERENCES

Mellor's "Comprehensive Treatise on Inorganic and Theoretical Chemistry," vol. 2, 1922 ed., pp. 282, 283.

Seidell, "Solubilities of Inorganic and Organic Compounds," vol. 1, pp. 513 and 639, D. Van Nostrand & Co., New York city, 1919.